Aug. 7, 1962 B. P. LE BOEUF 3,047,951
DEVICE FOR MOULDING CHEESE

Filed March 9, 1960 3 Sheets-Sheet 1

INVENTOR
Bernard P. Le Boeuf
By Watson, Cole, Grindle & Watson
ATTORNEYS

Aug. 7, 1962  B. P. LE BOEUF  3,047,951
DEVICE FOR MOULDING CHEESE
Filed March 9, 1960  3 Sheets-Sheet 2
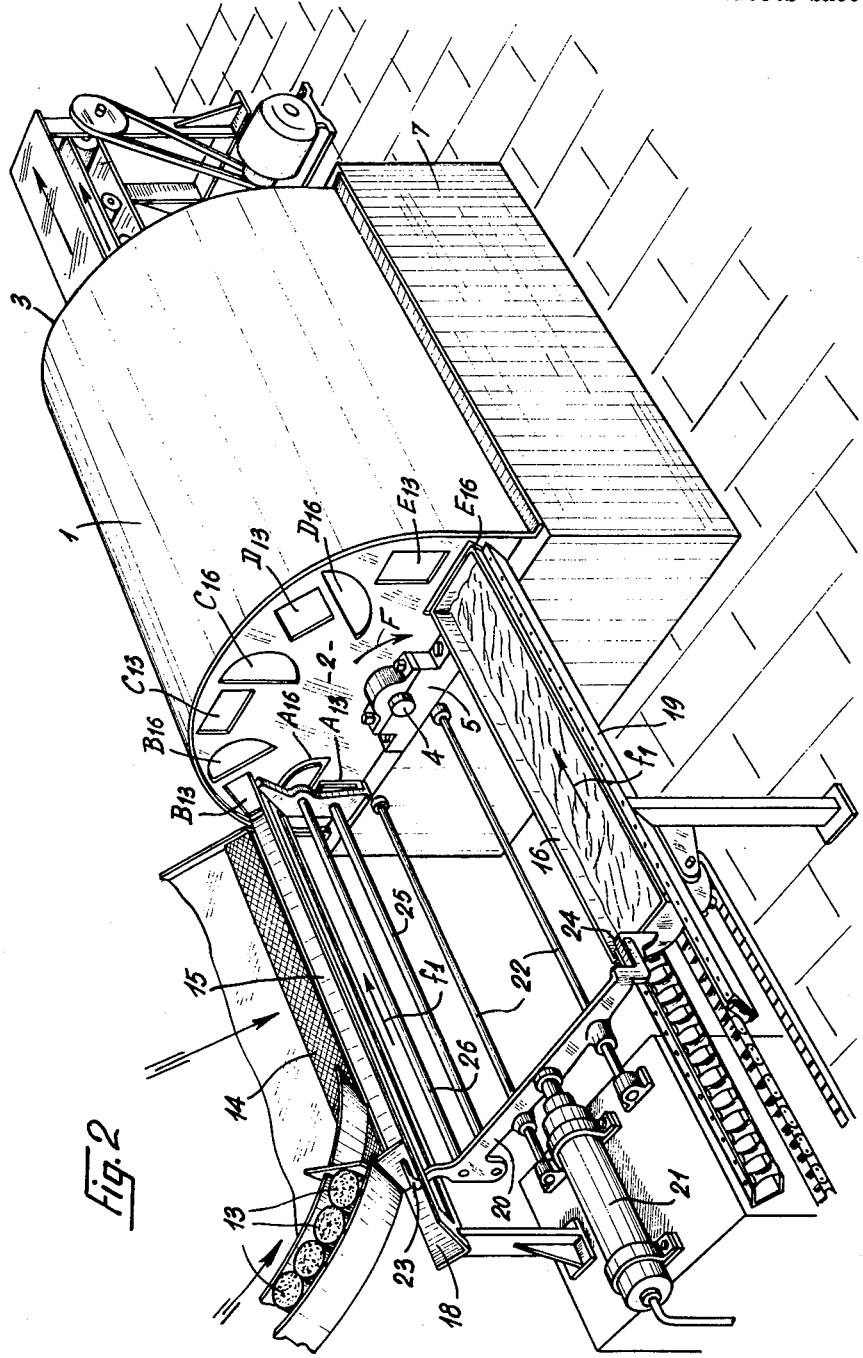
INVENTOR
Bernard P. Le Boeuf
By Watson, Cole, Grindle & Watson Aug. 7, 1962   B. P. LE BOEUF   3,047,951
DEVICE FOR MOULDING CHEESE
Filed March 9, 1960   3 Sheets-Sheet 3
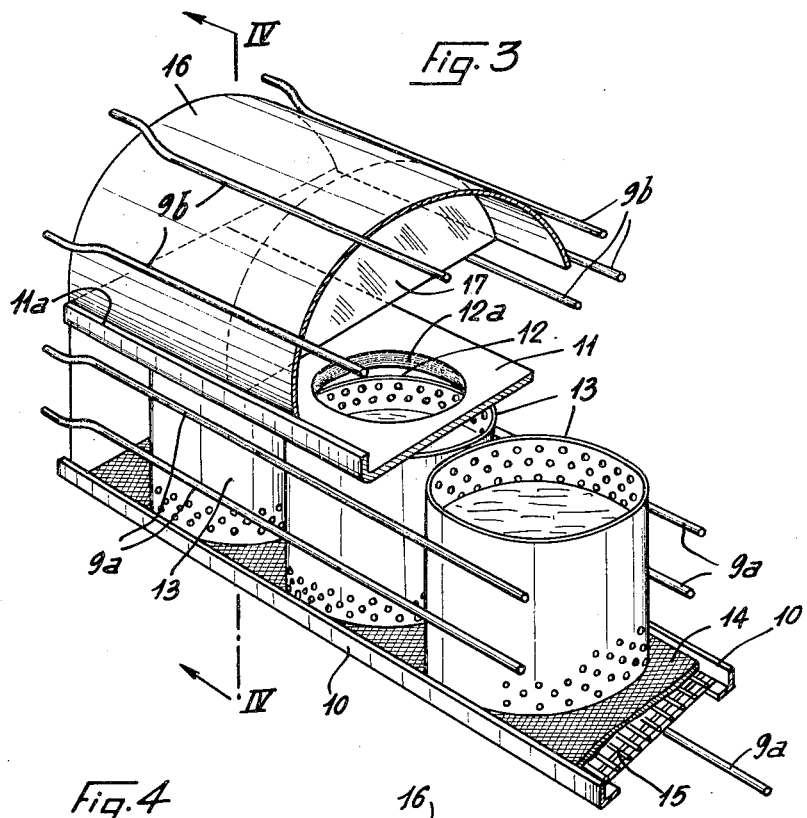
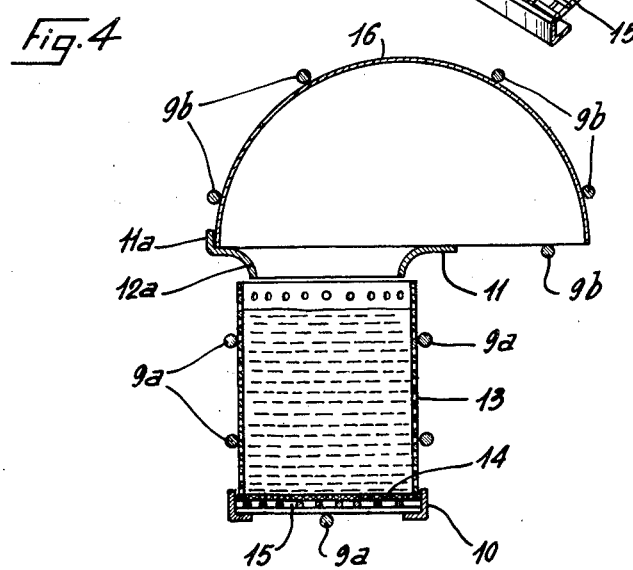
INVENTOR
Bernard P. Le Boeuf
By Watson, Cole, Grindle & Watson

United States Patent Office 3,047,951
Patented Aug. 7, 1962

3,047,951
DEVICE FOR MOULDING CHEESE
Bernard P. Le Boeuf, Avranches, Manche, France
Filed Mar. 9, 1960, Ser. No. 13,892
Claims priority, application France Mar. 16, 1959
6 Claims. (Cl. 31—45)

In the cheese-making industry the filling of moulds employed for manufacture of cheeses is generally carried out by hand; the milk curds are taken from a container of a suitable capacity allowing filling of a considerable number of moulds and a desired quantity of milk curds is discharged into each mould.

During this mould filling operation, a kind of spontaneous separation of milk curds occurs in the container, the richer matter accumulating at the upper part of the mass of milk curds.

In consequence, the first few moulds to be filled contain the rich matter, while the following moulds are filled with product which becomes poorer and poorer in quality.

This results in considerable variations in quality of cheeses produced in the same series of manufacture, although all are made out of a product which originally is of a uniform quality.

Moreover, the variations in the ambient temperature occurring during the filling of the moulds influence the quality of cheeses.

Lastly, during the filling of the moulds inclusions of air occur in the mass of the milk curds, which have a detrimental effect of producing variations in quality as regards the thickness of the cheese.

In the case of mechanical filling of the moulds the same imperfections are encountered, the milk curds before their discharge into moulds being stored in a tank, where spontaneous separation occurs all the more readily, in view of the more substantial quantity of material being employed.

With a view of overcoming the above imperfections, the inventor proposes a method of filling the moulds, subject of the present patent application, according to which the quantity of milk curds required for filling each mould is discharged not into the mould but into an intermediate container which is applied against the lower opening of the mould, the combination mould and container being subsequently immersed in a bath of milk serum produced beforehand by exudation of milk curds during the earlier manufacture of cheeses, and maintained in this bath during the transfer of all the milk curds from the intermediate container into the mould, this transfer taking place through a slow turning over of the combination mould and container, which brings the intermediate container above the mould.

This soaking in the milk serum takes advantage of the known characteristics of the serum, which by inclusion in the milk curds stabilises them. Moreover the filling of the mould being effected by a relatively slow turning over of the mould, the discharge of the milk curds into a mould is steady and the mould is filling up gradually, thus avoiding the risk of "breakage" or fragmentation of the milk curds, which is detrimental to the quality of cheese and which in addition causes losses of milk curds.

The invention includes also a machine for moulding of cheeses which utilises the method indicated above. According to one embodiment of the invention, this machine is constituted by a drum, with its longitudinal axis arranged horizontally, the drum comprising two end plates between which are arranged guiding means supporting on the one hand rows of moulds and on the other hand opposite to them charging funnels intended to contain the milk curds and fulfilling the role of intermediate containers mentioned beforehand.

The supports are positioned at the apexes of a polygon and an intermittent rotary motion is imparted to the drum, so as to cause successively each of the supports and consequently each of the rows or lines of moulds arranged above the charging funnels, to enter a bath of milk serum contained in a tank in which is engaged the lower part of the drum, and then to leave this bath, the charging funnels being then at the upper part of the moulds into which the milk curds have been discharged.

One of the end plates of the drum comprises openings through which the moulds and the charging funnels full of milk curds can enter into the drum, and the other end plate is provided with openings through which are removed the moulds filled with milk curds and the empty charging funnels.

Mechanical means such as conveyors and pushers are provided for the movement of the moulds and charging funnels into the drum, and for their removal from the drum.

The method thus carried out allows to obtain amongst others an equal quality for all the cheeses of a production series, this being due to: the invariability of a temperature during the filling of the moulds. This temperature can easily be controlled in the interior of the drum enclosed in a casing, the constancy of the mixture milk serum-milk curds the correct filling of the moulds avoiding amongst others inopportune inclusions of air.

The description which will follow, related to the accompanying drawings given as an example, will facilitate the understanding of how the moulding machine can be constructed, the particular features appearing in the description and in the drawings forming part of the invention.

FIG. 2 shows a view in perspective of the machine completed by mechanical handling means for handling moulds, troughs etc.

FIG. 3 shows another view in perspective showing a detail to a larger scale.

FIG. 4 shows a vertical cross-section on line IV—IV of the FIG. 3.

Figure 1:
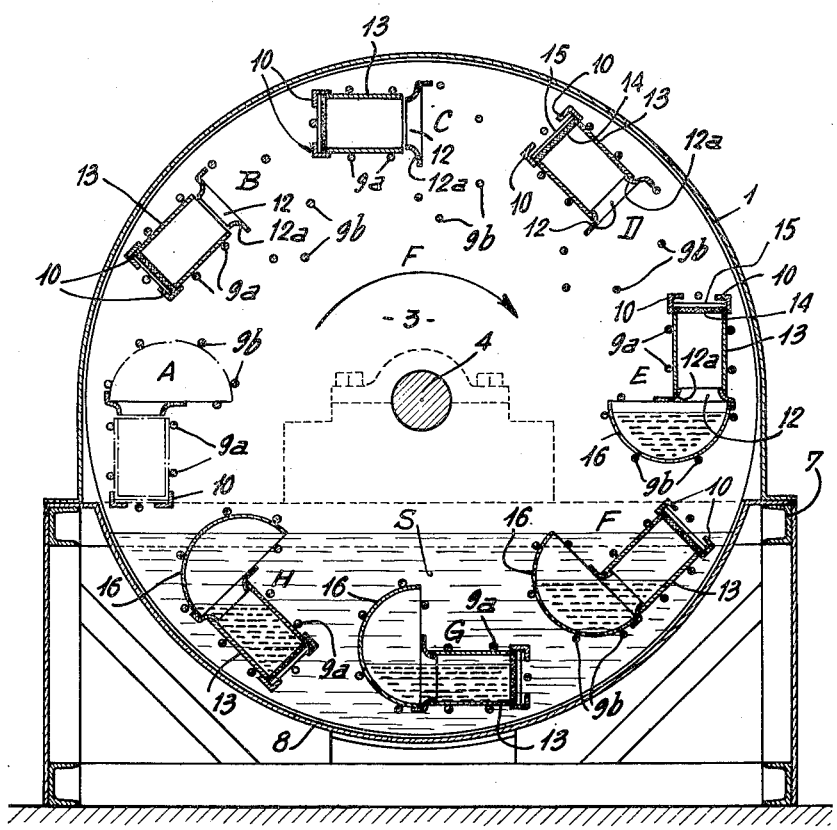
FIG. 1 shows a sectioned end view of the machine for moulding cheeses.

Referring to FIGS. 1 and 2 it will be seen that the machine comprises a drum constituted by two end plates 2 and 3. This drum is arranged to turn round its longitudinal axis which is mounted horizontally, and so the central shaft 4 of the drum is carried by pedestal bearings 5, 6 attached to a supporting framework 7.

This framework serves as a support for a tank 8 in which is engaged the lower part of the drum. A casing 1 open at its two ends and enclosing the upper part of the drum also rests on the framework 7.

Between the end plates 2 and 3 of the drum are arranged rods 9a, 9b and angles 10 attached by their ends to the said side plates.

These rods and angles are arranged in groups—eight in the example shown—which are designated by the reference letters A, B, C, D, E, F, G, H.

Each of these groups is completed by a plate 11 also attached to the two side plates 2 and 3. This plate comprises a series of openings 12 each surrounded by a flange 12a whose diameter is slightly smaller than that of each of the moulds to be employed with the machine. The shape of this flange instead of being circular, can be adapted to the shape of the cross-section of the mould, for example, it can be square, or of any other shape, such that the said mould could freely fit over and encase the flange.

The moulds 13, of circular cross-section for example, as FIG. 3 shows, are made to rest at the beginning of the moulding operation upon a wicker tray 14, generally made of bamboo-canes or other vegetable material. The wicker tray seats upon a screen tray 15, for example made of metal, and the screen tray as well as the wicker tray are carried by the angles 10.

The moulds 13 are held between the rods 9a and are so arranged that they touch each other along the whole length of the drum.

The plate 11 comprises at its side a raised lip 11a, which serves as a guiding abutment for one of the edges of the trough 16 whose length is equal to that of the drum. This trough 16 has entered by sliding in between the guides 9b which form a supporting cradle. The said trough is of semi-circular cross-section and is open throughout its entire length. Preferably it is provided with partitions 17 separated from each other by a distance equal to that which separates the openings 12 so that when the trough is placed in position in its supporting cradle 9b, each of the openings 12 is separated from the adjoining openings by a partition 17.

The compartments of the trough separated by partitions 17 constitute each an aforesaid intermediate container corresponding to the moulds 13.

To the previously mentioned groups A, B, C, D, E, F, G, H—each constituting a support for the elements of moulding: moulds 13, wicker tray 14, screen tray 15, troughs 16—correspond in the side plates 2 and 3 (FIG. 2) on the one hand, openings $A_{13}$, $B_{13}$, $C_{13}$, $D_{13}$, $E_{13}$, $F_{13}$, $G_{13}$, $H_{13}$, of suitable dimensions to allow the passage through them of moulds 13 of wicker tray 14 and of screen tray 15, and on the other hand openings $A_{16}$, $B_{16}$, $C_{16}$, $D_{16}$, $E_{16}$, $F_{16}$, $G_{16}$, $H_{16}$ of suitable dimensions to allow the passage through them of troughs 16.

In front of the side plate 2 is arranged a support 18 forming a passage-way into which are brought laterally at suitable intervals, in the first place a screen tray 15, in the second place a wicker tray 14 placed flat on the screen tray, and lastly a number of empty moulds 13 in a suitable quantity so that when arranged to touch each other upon the trays the moulds form a line of equal length to that of the drum. Also in front of the side plate 2 there is a support 19 whose function is to receive the troughs 16.

A pusher 20, operated by a telescopic jack 21 and guided by the rods 22, comprises two arms 23, 24; the arm 23 is provided to push in the direction $f_1$ the line of moulds 13 as also the trays 14 and 15 waiting in the passage-way 18; the arm 24 is provided to push in the same direction $f_1$ the trough carried by the support 19.

Two other rods 25 and 26 are provided to push out of the drum the moulds 13 in position inside the drum (rod 25) and the trough 16 also in position inside the drum (rod 26); the moulds and the trough are removed from the drum through the openings provided in the side plate 3 and identical with openings $A_{13}$, $B_{13}$, $C_{13}$, $D_{13}$, $E_{13}$, $F_{13}$, $G_{13}$, $H_{13}$ and $A_{16}$, $B_{16}$, $C_{16}$, $D_{16}$, $E_{16}$, $F_{16}$, $G_{16}$, $H_{16}$, in the side plate 2.

Preferably conveyors of known type are provided in front of the side plates 2 and 3 to assure mechanically the supply of the moulds, the trays and the trough, and also to assure the removal of these elements.

The operation of the machine is as follows:

The drum is driven in the direction F by an intermittent movement so that each of the groups A, B, C, D, E, F, G, H arrives successively opposite a charging station at which is carried out the placing in position inside the drum of the trays 14 and 15 and of the moulds 13.

In the drawings, this charging station (passage-way 18) is shown opposite the opening $B_{13}$ (FIG. 2); the group B (FIG. 1) is thus provided with the trays and the moulds. Through an angular displacement of 45° the group A is brought opposite to the charging station, followed by a group H, and so on.

As a result of these successive angular displacements, the group B is brought opposite to the charging station of the trough 16, which is charged through the opening $B_{16}$ brought opposite to the support 19, thus occupying the position of opening $E_{16}$ which was opposite the support 19 at the beginning of the movement a FIG. 2 shows.

The trough filled with milk curds and introduced into the drum takes position in the vicinity of the lower part of the moulds, which by their own weight come to fit over and enclose the corresponding flanges 12a of the plate 12.

By rotation of the drum, the group B (which occupies position of group E, FIG. 1) is made to enter into the bath of milk serum S contained in the tank 8. This group B will occupy successively positions of groups F, G and H as is shown in FIG. 1.

It will be understood that during this travel through the bath S, the milk curds contained in the trough 16, will be permeated by the milk serum and will be discharged progressively from the trough into the moulds.

At its exit from the bath S, the trough is completely empty of the milk curds which have been slowly transferred into the moulds 13.

Finally the group B arrives at the position of group A (FIG. 1). On leaving the bath S, the excess of milk serum drips back and falls into the bath S.

In the position occupied by group A (FIG. 1) takes place the removal to the outside of the drum of the moulds 13 filled with milk curds, of the trays 14 and 15 and of the empty troughs 16.

This removal is effected through openings in the end plate 3 corresponding to the openings $A_{13}$ and $A_{16}$ shown for the end plate 2.

Subsequently the group B is brought back to its initial starting position opposite to the openings $B_{13}$ and $B_{16}$ through which is effected the charging of trays and moulds.

Thus the cycle is completed.

The draining of the milk serum from the moulds arriving in position A brings to the bath S a fresh quantity of milk serum resulting from the exudation of the milk curds contained in the moulds, and this contribution results in the regeneration of the bath S.

The level of the bath S can be lower or higher according to whether a shorter or longer immersion time of the moulds and the troughs in the milk serum is required, this time varying according to the desired quality of the cheese. Known means allow to regulate the desired height of the level of the bath S and ensure in addition maintenance of this level at the given height in spite of the addition of milk serum arriving from the moulds filled with milk curds.

It will be evident that modifications are possible to the methods of carrying into effect the invention as described, notably by the substitution of equivalent technical means, without going beyond the framework of the present invention.

What I claim is:

1. A machine for molding cheeses comprising in combination a frame, a drum mounted on said frame for rotation about a horizontal axis and comprising a pair of end plates and a plurality of supporting assemblies secured between said plates in parallelism with said axis, each said assembly comprising means for supporting a row of open molds and means for supporting an elongated open container with the openings of said molds held against the opening of said container, whereby when said drum is rotated milk curds contained in said containers is progressively fed into said molds.

2. A machine as claimed in claim 1 wherein said frame comprises a tank and the lower part of said drum is located within said tank, whereby feeding said molds may be performed within a bath of milk serum contained in said tank.

3. A machine as claimed in claim 1 wherein said assemblies are regularly distributed about said axis and said plates are provided, in axial alignment with said assemblies, with openings through which said molds and containers may be passed, said means for supporting said molds and said means for supporting said containers comprising elongated members parallel to said axis and surrounding said openings whereby said rows of molds and said containers may be shifted into and out of said drum.

4. A machine as claimed in claim 3 wherein between said means for supporting said container and said means for supporting said row of molds is provided a flange adaptable on said opening of said container and comprising a series of apertures whose number corresponds to the number of molds in said row whereby said curds is fed from said containers into said molds through said apertures.

5. A machine for molding cheeses comprising in combination a frame, a drum mounted on said frame for rotation about a horizontal axis and comprising a pair of end plates and a plurality of supporting assemblies secured between said plates in parallelism with said axis and regularly arranged about said axis, each assembly comprising elongated members parallel to said axis for supporting a row of open molds and an elongated open container with the opening of said molds facing the opening of said container, said end plates being provided, in axial alignment with said assemblies, with openings through which said molds and containers may be passed; guiding means on said frame on one side of said drum for supporting a row of empty molds and a container containing curds in parallelism with said axis at a distance of said axis corresponding to the location of the respective said openings in said end plates; means for imparting to said drum an intermittent rotary movement for successively bringing said openings in registration with said guiding means and pushing means associated with said guiding means for pushing a row of empty molds and a container into said drum for pushing a row of full molds and an empty container out of said drum when said openings register with said guiding means.

6. The combination of claim 5 wherein said frame comprises a tank in which the lower part of said drum is located, a casing enclosing the remaining part of said drum being located above said tank.

References Cited in the file of this patent

FOREIGN PATENTS 77,797    Netherlands _____ Apr. 15, 1955